US009488898B2

(12) United States Patent
Inoue et al.

(10) Patent No.: US 9,488,898 B2
(45) Date of Patent: Nov. 8, 2016

(54) IMAGING APPARATUS AND FOCUS CONTROL METHOD

(71) Applicant: FUJIFILM Corporation, Tokyo (JP)

(72) Inventors: Kazuki Inoue, Saitama (JP); Takashi Aoki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/724,531

(22) Filed: May 28, 2015

(65) Prior Publication Data

US 2015/0286112 A1    Oct. 8, 2015

Related U.S. Application Data

(63) Continuation of application No. PCT/JP2013/074709, filed on Sep. 12, 2013.

(30) Foreign Application Priority Data

Nov. 29, 2012 (JP) ................................. 2012-260981

(51) Int. Cl.
G03B 13/36    (2006.01)
H04N 5/235    (2006.01)
(Continued)

(52) U.S. Cl.
CPC .............. G03B 13/36 (2013.01); G02B 7/36 (2013.01); H04N 5/2254 (2013.01); H04N 5/2353 (2013.01); H04N 5/23212 (2013.01); H04N 5/3696 (2013.01)

(58) Field of Classification Search
CPC .. G03B 13/36; H04N 5/2353; H04N 5/2254; H04N 5/23212; H04N 5/3696; G02B 7/36
See application file for complete search history.

(56) References Cited

U.S. PATENT DOCUMENTS 5,640,618 A * 6/1997 Uchiyama ............... G02B 7/28
396/121
5,652,926 A    7/1997 Saito
(Continued)

FOREIGN PATENT DOCUMENTS

JP    8-327885 A    12/1996
JP    2005-77959 A    3/2005
(Continued)

OTHER PUBLICATIONS

International Search Report issued on PCT/JP2013/074709, mailed on Dec. 17, 2013.
(Continued)

Primary Examiner — Twyler Haskins
Assistant Examiner — Peter Chon
(74) Attorney, Agent, or Firm — Birch, Stewart, Kolasch & Birch, LLP

(57) ABSTRACT

The invention provides an imaging apparatus and a focus control method in which an optimal AF system can be selected in accordance with an environment in which an image of a photographic subject is taken, an imaging condition in which the image is taken, etc. so that the quality of the taken image can be improved. A system control portion 11 of the imaging apparatus selects and executes one from focus control based on a phase difference AF system and focus control based on a contrast AF system in accordance with the magnitude relation between a determination threshold set for an F-number and the set F-number in the case where an AF instruction has been issued. The system control portion 11 can vary the determination threshold in accordance with an exposure value in the case where the AF instruction has been issued.

3 Claims, 11 Drawing Sheets

(51) Int. Cl.
  *H04N 5/225* (2006.01)
  *H04N 5/232* (2006.01)
  *H04N 5/369* (2011.01)
  *G02B 7/36* (2006.01)

(56) References Cited

U.S. PATENT DOCUMENTS

| | | | |
|---|---|---|---|
| 7,423,685 B2 | 9/2008 | Morimoto | |
| 8,319,870 B2 | 11/2012 | Shintani et al. | |
| 9,354,487 B2* | 5/2016 | Morimoto | G03B 13/00 |
| 2005/0046711 A1 | 3/2005 | Morimoto | |
| 2006/0008265 A1* | 1/2006 | Ito | H04N 5/23212 |
| | | | 396/125 |
| 2008/0025714 A1* | 1/2008 | Ishii | G03B 13/36 |
| | | | 396/104 |
| 2008/0118238 A1* | 5/2008 | Sogawa | G02B 7/285 |
| | | | 396/128 |
| 2011/0001858 A1 | 1/2011 | Shintani et al. | |

FOREIGN PATENT DOCUMENTS

| | | |
|---|---|---|
| JP | 2009-063921 A | 3/2009 |
| JP | 2011-002473 A | 1/2011 |
| JP | 2011-154385 A | 8/2011 |
| JP | 2012-049201 A | 3/2012 |
| WO | WO 2009/104390 A1 | 8/2009 |
| WO | 2012/081647 A1 | 6/2012 |

OTHER PUBLICATIONS

PCT/IPEA/409—Issued in PCT/JP2013/074709 dated Aug. 11, 2014.

PCT/ISA/237—Issued in PCT/JP2013/074709, mailed on Dec. 17, 2013.

Office Action issued in corresponding Chinese Application No. 201380062558.6 on Jul. 27, 2016 with an English Translation.

\* cited by examiner

IMAGING APPARATUS AND FOCUS CONTROL METHOD

CROSS REFERENCE TO RELATED APPLICATION

This is a continuation of International Application No. PCT/JP2013/074709 filed on Sep. 12, 2013, and claims priority from Japanese Patent Application No. 2012-260981 filed on Nov. 29, 2012, the entire disclosures of which are incorporated herein by reference.

TECHNICAL FIELD

The present invention relates to an imaging apparatus and a focus control method which can use both phase difference AF and contrast AF.

BACKGROUND ART

Recently, the demand for information apparatuses with an imaging function, such as digital still cameras, digital video cameras, portable phones such as smartphones, and PDAs (Personal Digital Assistants) increases suddenly with the increase in resolution of solid-state imaging devices such as CDD (Charge Coupled Device) image sensors or CMOS (Complementary Metal Oxide Semiconductor) image sensors. Incidentally, each information apparatus having the aforementioned imaging function is referred to as imaging apparatus.

In these imaging apparatuses, a contrast AF (Auto Focus) system or a phase difference AF system has been used as a focus control method for focusing on a main photographic subject. Imaging apparatuses using both the phase difference AF system and the contrast AF system have been also proposed so far (for example, Patent Literatures 1 to 4).

Patent Literature 1 describes an imaging apparatus which selects to perform contrast AF or to perform contrast AF and phase difference AF in combination in accordance with whether to use electronic zoom or not.

Patent Literature 2 describes an imaging apparatus which selects to perform contrast AF or to perform phase difference AF in accordance with the kind of a lens to be mounted and the contrast of a photographic subject.

Patent Literature 3 describes an imaging apparatus which selects to perform contrast AF or to perform phase difference AF in accordance with the frequency of a photographic subject.

Patent Literature 4 describes an imaging apparatus which selects to perform contrast AF or to perform phase difference AF in accordance with an exposure condition.

CITATION LIST

Patent Literature 1: JP-A-2005-77959
Patent Literature 2: WO 2009/104390
Patent Literature 3: JP-A-2009-63921
Patent Literature 4: JP-A-2012-49201

SUMMARY OF INVENTION

The imaging apparatuses described in Patent Literatures 1 to 4 change over the AF system in accordance with a fixed threshold so as to perform phase difference AF when a parameter is not lower than the threshold and perform contrast AF when the parameter is lower than the threshold. Since the threshold is fixed, there is however a possibility that contrast AF may be performed in an imaging condition in which it is better to perform phase difference AF, or on the contrary, phase difference AF may be performed in an imaging condition in which it is better to perform contrast AF.

The invention has been accomplished in consideration of the aforementioned circumstances. An object of the invention is to provide an imaging apparatus and a focus control method in which an optimal AF system can be selected in accordance with an environment in which an image of a photographic subject is taken, an imaging condition in which the image is taken, etc. so that the quality of the taken image can be improved.

The imaging apparatus according to the invention includes: an imaging device which images a photographic subject through an imaging optical system including a focus lens; a focus control portion which selects and executes one from first focus control for controlling the focus lens to a focus position based on a phase difference AF system and second focus control for controlling the focus lens to a focus position based on a contrast AF system in accordance with the relation between a determination threshold set for one of parameters correlating with contrast or brightness of the photographic subject to be imaged by the imaging device and a value taken by the one parameter when an instruction to perform focus control on the focus lens has been issued; and a determination threshold varying portion which can vary the determination threshold in accordance with a predetermined condition; wherein: the parameters include parameters concerned with photographic subject conditions and parameters concerned with imaging conditions set in the imaging apparatus.

The focus control method according to the invention includes: a focus control step of selecting and executing one from first focus control for controlling a focus lens to a focus position based on a phase difference AF system and second focus control for controlling the focus lens to a focus position based on a contrast AF system in accordance with the relation between a determination threshold set for one of parameters correlating with contrast or brightness of a photographic subject to be imaged by an imaging device and a value taken by the one parameter when an instruction to perform focus control on the focus lens disposed in front of the imaging device has been issued; and a determination threshold varying step of being capable of varying the determination threshold in accordance with a predetermined condition; wherein: the parameters include parameters concerned with photographic subject conditions and parameters concerned with imaging conditions.

For example, the imaging apparatus described in Patent Literature 3 changes over focus control to perform contrast AF or to perform hybrid AF (system using both contrast AF and phase difference AF) or phase difference AF in accordance with the kind of a lens to be mounted. In the imaging apparatus, after the lens has been mounted once, either contrast AF or hybrid AF is performed regardless of an environment in which an image of a photographic subject is taken, an imaging condition in which the image is taken, etc. In comparison with the imaging apparatus, the invention can select an optimal AF system in accordance with an environment in which an image of a photographic subject is taken, an imaging condition in which the image is taken, etc. to thereby improve the quality of the taken image even after the lens has been mounted once.

According to the invention, it is possible to provide an imaging apparatus and a focus control method in which an optimal AF system can be selected in accordance with an environment in which an image of a photographic subject is taken, an imaging condition in which the image is taken, etc. so that the quality of the taken image can be improved.

Figure 1:
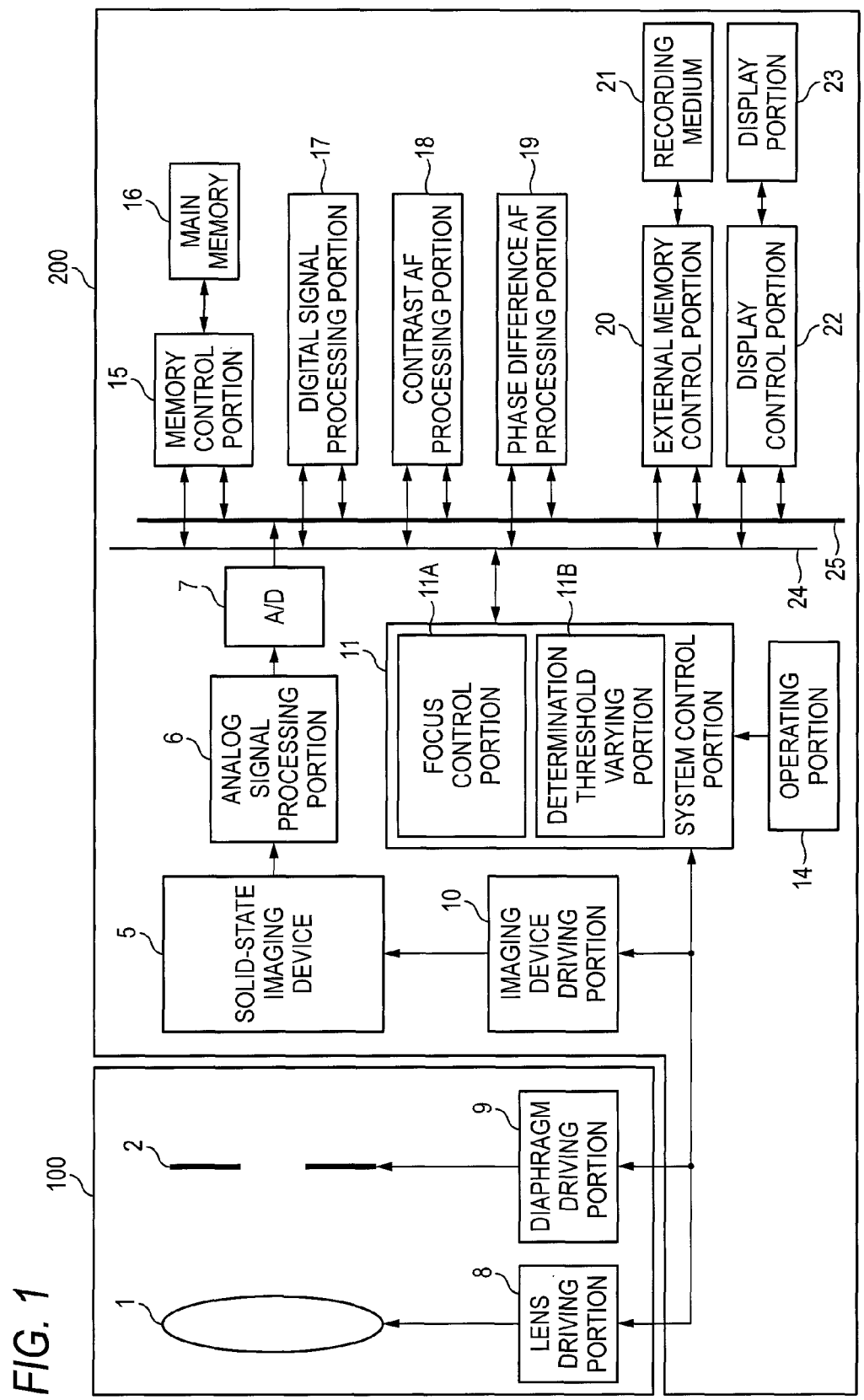
FIG. 1 is a diagram schematically showing the configuration of a digital camera as an example of an imaging apparatus for explaining an embodiment of the invention.

REFERENCE SIGNS LIST 5 solid-state imaging device
11 system control portion
19 phase difference AF processing portion
50 light-receiving surface
51 pixel
52 AF area (phase difference detection area)
51R, 51L phase difference detection pixel
X row direction
Y column direction

DESCRIPTION OF EMBODIMENT

An embodiment of the invention will be described below with reference to the drawings.

FIG. 1 is a diagram schematically showing the configuration of a digital camera as an example of an imaging apparatus for explaining an embodiment of the invention.

The digital camera shown in FIG. 1 is provided with a lens device 100 and a camera body 200. The lens device 100 serves as an imaging optical system. The camera body 200 is provided with a not-shown mount mechanism on which the lens device 100 is mounted.

The lens device 100 includes an imaging lens 1 including a focus lens, a zoom lens, etc., a diaphragm 2, a lens driving portion 8, and a diaphragm driving portion 9. The imaging lens 1 may include at least the focus lens.

The lens device 100 is detachably attached to the camera body 200 so that the lens device 100 can be replaced by any other lens device.

The camera body 200 is provided with a solid-state imaging device 5, an analog signal processing portion 6, and an A/D conversion circuit 7. The solid-state imaging device 5 is of a CCD type, a CMOS type etc. to image a photographic subject through the lens device 100. The analog signal processing portion 6 is connected to the output of the solid-state imaging device 5 to perform analog signal processing such as correlated double sampling processing thereon. The A/D conversion circuit 7 converts an analog signal outputted from the analog signal processing portion 6 into a digital signal. The analog signal processing portion 6 and the A/D conversion circuit 7 are controlled by a system control portion 11. The analog signal processing portion 6 and the A/D conversion circuit 7 may be built in the solid-state imaging device 5.

The system control portion 11 which generally controls the whole of an electric control system of the digital camera controls the lens driving portion 8 to adjust the position of the focus lens included in the imaging lens 1 or adjust the position of the zoom lens included in the imaging lens 1. Further, the system control portion 11 controls an aperture amount of the diaphragm 2 through the diaphragm driving portion 9 to adjust a light exposure amount.

In addition, the system control portion 11 drives the solid-state imaging device 5 through an imaging device driving portion 10 to output an image of a photographic subject taken through the imaging lens 1, as a taken image signal. An instruction signal issued from a user is inputted to the system control portion 11 through an operating portion 14.

The system control portion 11 has a focus control portion 11A and a determination threshold varying portion 11B as functional blocks. As will be described later, the focus control portion 11A selects one from a contrast AF processing portion 18 and a phase difference AF processing portion 19 to perform focus control on the imaging lens 1 in accordance with a focus position determined by the selected processing portion. The determination threshold varying portion 11B can vary a determination threshold which will be described later in accordance with a predetermined condition.

Further, the electric control system of the digital camera is provided with a main memory 16, a memory control portion 15, a digital signal processing portion 17, the contrast AF processing portion 18, the phase difference AF processing portion 19, an external memory control portion 20, and a display control portion 22. The memory control portion 15 is connected to the main memory 16. The digital signal processing portion 17 performs interpolation calculation, gamma correction calculation, RGB/YC conversion processing, etc. on the taken image signal outputted from the A/D conversion circuit 7 to thereby generate taken image data. The contrast AF processing portion 18 determines a focus position based on a contrast AF system. The phase difference AF processing portion 19 determines a focus position based on a phase difference AF system. An attachable/detachable recording medium 21 is connected to the external memory control portion 20. A display portion 23 mounted in the back of the camera etc. is connected to the display control portion 22. The memory control portion 15, the digital signal processing portion 17, the contrast AF processing portion 18, the phase difference AF processing portion 19, the external memory control portion 20 and the display control portion 22 are connected to one another through a control bus 24 and a data bus 25 so as to be controlled in accordance with an instruction issued from the system control portion 11.

Figure 2:
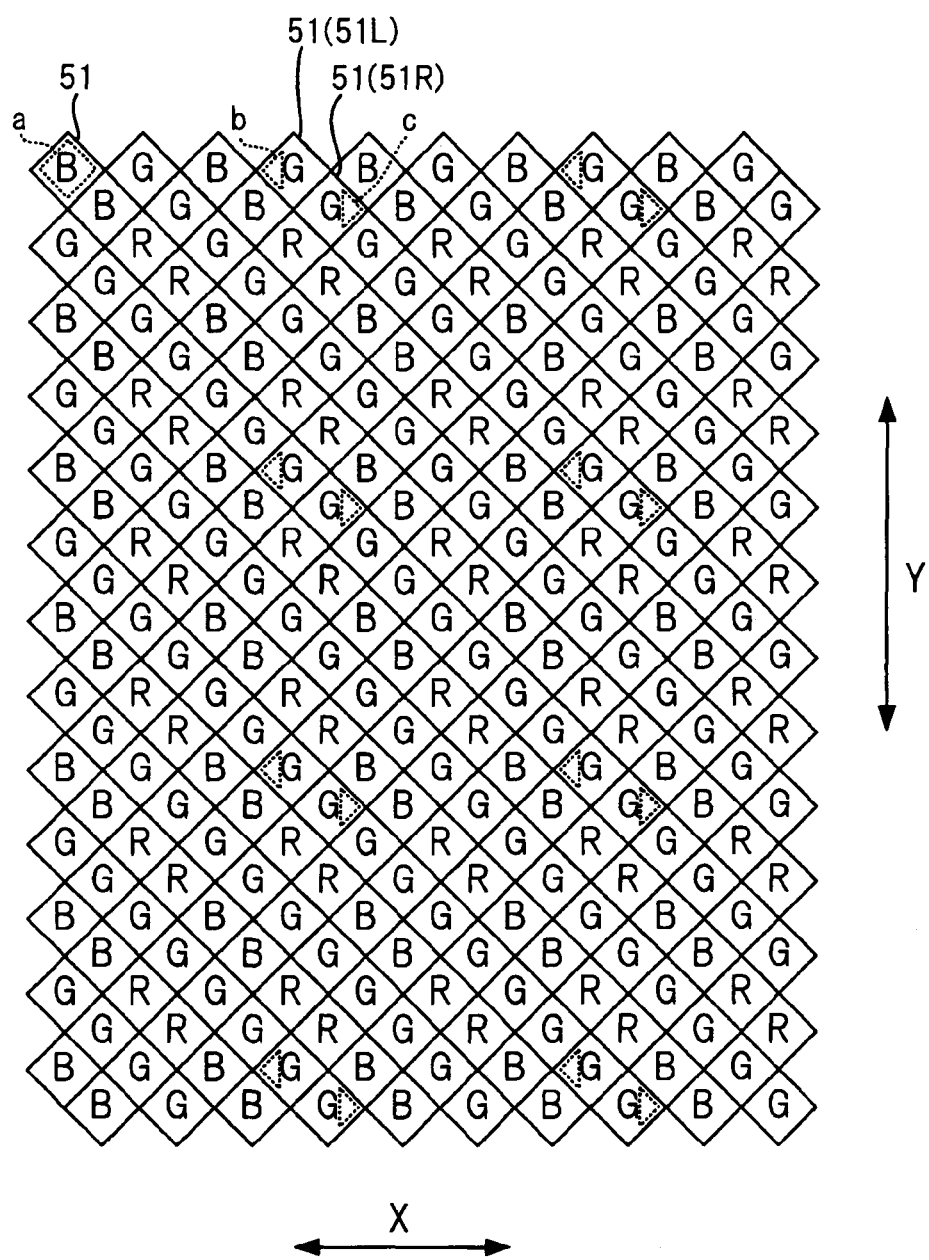
FIG. 2 is a partially enlarged view showing the planar configuration of a solid-state imaging device 5 mounted in the digital camera shown in FIG. 1.

FIG. 2 is a partially enlarged view showing the planar configuration of the solid-state imaging device 5 mounted in the digital camera shown in FIG. 1.

The solid-state imaging device 5 is provided with a large number of pixels 51 (square blocks in FIG. 2) arrayed two-dimensionally in a row direction X and a column direction Y perpendicular to the row direction X on a light-receiving surface. FIG. 2 does not show all the pixels 51. In fact, about several million to ten million and several ten thousand pixels 51 are arrayed two-dimensionally. When an image is taken by the solid-state imaging device 5, output signals are obtained from the large number of pixels 51 respectively.

Each pixel 51 includes a photoelectric conversion portion such as a photodiode, and a color filter formed above the photoelectric conversion portion.

In FIG. 2, a character "R" is added to each pixel 51 including a color filter (R filter) through which red light can be transmitted, a character "G" is added to each pixel 51 including a color filter (G filter) through which green light can be transmitted, and a character "B" is added to each pixel 51 including a color filter (B filter) through which blue light can be transmitted.

The large number of pixels 51 form an array in which pixel rows each consisting of a plurality of pixels 51 arranged in the row direction X are disposed side by side in the column direction Y. The odd-numbered pixel rows and the even-numbered pixel rows are displaced from each other in the row direction X substantially by ½ of an array pitch of the pixels 51 in each pixel row.

The color filters included in the respective pixels 51 in the odd-numbered pixel rows are arranged in a Bayer array as a whole. In addition, the color filters included in the respective pixels 51 in the even-numbered pixel rows are also arranged in a Bayer array as a whole. Each odd-numbered-row pixel 51 is paired with a pixel 51 which is adjacent to the odd-numbered-row pixel 51 on the right lower side thereof and which detects the same color light as the odd-numbered-row pixel 51. In the description of the invention, "two pixels adjacent to each other" means two pixels which are the shortest in length of a line segment connecting the centers of the two pixels.

According to the solid-state imaging device 5 having such a pixel array, output signals of each pair of two pixels 51 are added to each other so that the sensitivity of the camera can be made higher. In addition, when the light exposure times of two pixels 51 in each pair are changed from each other and the output signals of the two pixels 51 are added to each other, the dynamic range of the camera can be made wider.

In the solid-state imaging device 5, a part of the pairs are used as pairs of pixels for detecting a phase difference (hereinafter also referred to as phase difference pairs). In the example of FIG. 2, each phase difference pair is constituted by a phase difference detection pixel 51R and a phase difference detection pixel 51L obliquely adjacent to each other. The phase difference pair is not limited to a pair of same color pixels adjacent to each other but may be a pair of same color pixels which are close to each other, for example, at a distance of about 1 or 2 pixels or several pixels.

Each phase difference detection pixel 51R receives one of a pair of luminous fluxes transmitted through different portions of an iris region of the imaging lens 1 (for example, a luminous flux transmitted through the right half of the iris region) and outputs a signal corresponding to the received light amount. That is, the phase difference detection pixel 51R provided in the solid-state imaging device 5 takes an image formed by one of the pair of luminous fluxes transmitted through the different portions of the iris region of the imaging lens 1.

Each phase difference detection pixel 51L receives the other of the pair of luminous fluxes (for example, a luminous flux transmitted through the left half of the iris region) and outputs a signal corresponding to the received light amount. That is, the phase difference detection pixel 51L provided in the solid-state imaging device 5 takes an image formed by the other of the pair of luminous fluxes transmitted through the different portions of the iris region of the imaging lens 1.

Incidentally, the plurality of pixels 51 (hereinafter referred to as imaging pixels) other than the phase difference detection pixels 51R and 51L serve for taking an image formed by the luminous fluxes transmitted through substantially the entire portion of the iris region of the imaging lens 1. Of the imaging pixels 51, each pixel 51 mounted with the R filter will be hereinafter also referred to as R pixel 51, each pixel 51 mounted with the G filter will be hereinafter also referred to as G pixel 51 and each pixel 51 mounted with the B filter will be hereinafter also referred to as B pixel 51.

A light-shielding film is provided above the photoelectric conversion portion of each pixel 51. An aperture defining a light-receiving area of the photoelectric conversion portion is formed in the light shielding film.

The center of the aperture (designated by the symbol a in FIG. 2) of each imaging pixel 51 is aligned with the center of the photoelectric conversion portion of the imaging pixel 51 (the center of the square block). Incidentally, in order to simplify the drawing, the aperture a as to the imaging pixels 51 is only shown in one place in FIG. 2.

On the other hand, the center of the aperture (designated by the symbol c in FIG. 2) of each phase difference detection pixel 51R is biased to the right side with respect to the center of the photoelectric conversion portion of the phase difference detection pixel 51R. The center of the aperture (designated by the symbol b in FIG. 2) of each phase difference detection pixel 51L is biased to the left side with respect to the center of the photoelectric conversion portion of the phase difference detection pixel 51L.

In the solid-state imaging device 5, a part of the pixels 51 mounted with the green color filters serve either as the phase difference detection pixels 51R or as the phase difference detection pixels 51L.

The phase difference detection pixels 51R and the phase difference detection pixels 51L are disposed discretely and cyclically in the region where the pixels 51 are located.

In the example of FIG. 2, the phase difference detection pixels 51R are disposed at intervals of three pixels in the row direction X in a part of the even-numbered pixel rows (four pixel rows arranged at intervals of three pixels in the example of FIG. 2). In the example of FIG. 2, the phase difference detection pixels 51L are disposed in the same cycles as the phase difference detection pixels 51R in the row direction X in a part of the odd-numbered pixel rows (pixel rows adjacent to the pixel rows including the phase difference detection pixels 51R).

With such a configuration, a major part of light transmitted through the apertures b of the light-shielding films and received by the pixels 51L consists of light coming from the left part of the imaging lens 1 provided on the upper side of the paper plane of FIG. 2 as seen from the photographic subject, that is, light coming from a direction in which the photographic subject is seen by the right eye of the user. On the other hand, a major part of light transmitted through the apertures c of the light-shielding films and received by the pixels 51R consists of light coming from the right part of the imaging lens 1 as seen from the photographic subject, that is, light coming from a direction in which the photographic subject is seen by the left eye of the user.

That is, a taken image signal in which the photographic subject is viewed by the left eye of the user can be obtained by all the phase difference detection pixels 51R and a taken image signal in which the photographic subject is seen by the right eye of the user can be obtained by all the phase difference detection pixels 51L. Therefore, when the both are combined and subjected to correlation calculation, phase difference information can be obtained.

Incidentally, the aperture of the light-shielding film for the phase difference detection pixel 51R is made eccentric in an opposite direction to that for the phase difference detection pixel 51L so that the phase difference information can be obtained between the phase difference detection pixel 51R and the phase difference detection pixel 51L. However, the structure for obtaining the phase difference information is not limited thereto but any well-known structure may be used. For example, a structure in which one common microlens (top lens) is mounted for each phase difference pair may be used.

Figure 3:
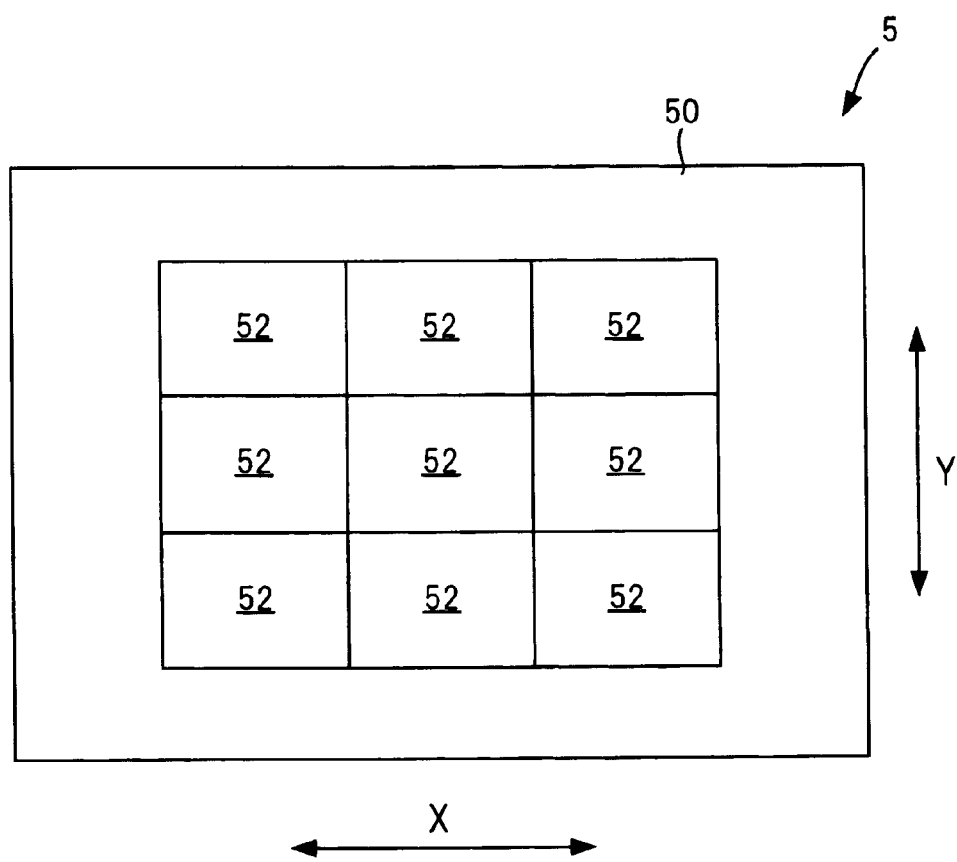
FIG. 3 is a planar pattern view showing the overall configuration of the solid-state imaging device 5 mounted in the digital camera shown in FIG. 1.

FIG. 3 is a planar pattern view showing the overall configuration of the solid-state imaging device 5 mounted in the digital camera shown in FIG. 1.

The solid-state imaging device 5 has a light-receiving surface 50 on which all the pixels 51 are disposed. Nine phase difference detection areas (hereinafter referred to as AF areas) 52 from which the phase difference information should be acquired are provided in the light-receiving surface 50 in the example of FIG. 2.

Each of the AF areas 52 is an area including imaging pixels 51 (R pixels 51) mounted with the R filters, imaging pixels 51 (G pixels 51) mounted with the G filters, imaging pixels 51 (B pixels 51) mounted with the B filters, and a plurality of phase difference pairs.

Only imaging pixels 51 are disposed in the remaining part of the light-receiving surface 50 other than the AF areas 52. Incidentally, the AF areas 52 may be provided in the light-receiving surface 50 without any gap.

The phase difference AF processing portion 19 shown in FIG. 1 uses an output signal group read from the phase difference detection pixels 51L and the phase difference detection pixels 51R in one AF area 52 selected by a user's operation etc. from the nine AF areas 52, to thereby calculate a phase difference amount which is a relative displacement amount between two images formed by the aforementioned pair of luminous fluxes. Based on the phase difference amount, a focus adjustment state of the imaging lens 1 is obtained. Here, the focus adjustment state includes an amount of deviation from a focusing state and a direction of the deviation from the focusing state. That is, a defocus amount is obtained. The phase difference AF processing portion 19 determines a focus position of the focus lens from the defocus amount.

The contrast AF processing portion 18 shown in FIG. 1 analyzes the image taken by the one AF area 51 selected by the user's operation etc. from the nine AF areas 52, and determines the focus position of the imaging lens 1 based on a well-known contrast AF system.

That is, while the position of the focus lens of the imaging lens 1 is moved by the control of the system control portion 11, the contrast AF processing portion 18 obtains contrasts (differences between light and shade) of images obtained for respective moved positions. The contrast AF processing portion 18 determines a focus lens position in which the contrast becomes largest, as the focus position.

Incidentally, the number of AF areas 52 to be selected may not be one, but AF areas 52 arranged side by side continuously may be selected alternatively.

The system control portion 11 shown in FIG. 1 uses the focus control portion 11A to select either the contrast AF processing portion 18 or the phase difference AF processing portion 19 in accordance with the relation between a determination threshold set for one of parameters correlating with the contrast or brightness of the photographic subject to be imaged by the solid-state imaging device 5 (the photographic subject to be imaged by the selected AF area 52) and a value taken by the one parameter when an instruction to perform focus control has been issued. A focus position is determined by the selected contrast AF processing portion 18 or phase difference AF processing portion 19 so that the focus lens of the imaging lens 1 can be controlled to a focus position based on the determined focus position.

The parameters correlating with the contrast or brightness of the photographic subject to be imaged include parameters concerned with photographic subject conditions determined based on the photographic subject, and parameters concerned with imaging conditions set in the camera. The parameters concerned with the photographic subject conditions include a contrast value and a luminance value of a taken image of the photographic subject. The parameters concerned with the imaging conditions include an F-number, a focal length and a focus lens position of the imaging optical system, an exposure value of the solid-state imaging device 5 at the time of imaging the photographic subject, etc.

In addition, the system control portion 11 can use the determination threshold varying portion 11B to vary the determination threshold in accordance with a predetermined condition. For example, the system control portion 11 can vary the determination threshold in accordance with at least one of the parameters other than the aforementioned one parameter, the size (the width in the column direction Y of the selected AF area 52) of the photographic subject from which a phase difference should be detected by the phase difference detection pixels 51R and 51L, an image resolution set in the camera, and a spatial frequency of the photographic subject.

Figure 4A:
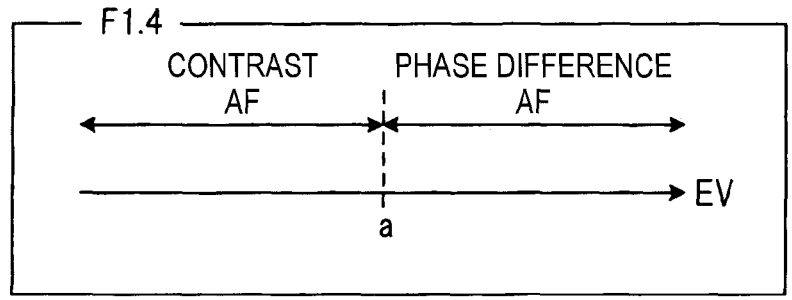
FIGS. 4A and 4B are views explaining an example for setting a determination threshold as a criterion based on which focus control is changed over between phase difference AF and contrast AF.
Figure 4B:
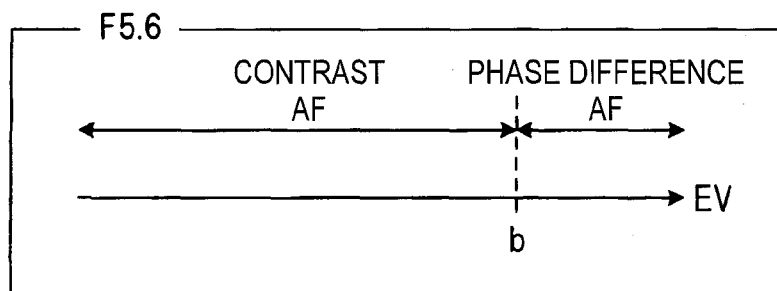

FIGS. 4A and 4B are views explaining an example for setting a determination threshold as a criterion based on which focus control is changed over between the phase difference AF and the contrast AF.

In the example of FIGS. 4A and 4B, a determination threshold is set for the exposure value (EV) of the solid-state imaging element 5 and the determination threshold can be varied in accordance with the F-number of the imaging optical system.

As shown in FIG. 4A, when the F-number is set at F1.4, the system control portion 11 selects the contrast AF processing portion 18 in the range in which the set EV value is lower than a determination threshold a, and selects the phase difference AF processing portion 19 in the range in which the set EV value is not lower than the determination threshold a.

In addition, as shown in FIG. 4B, when the F-number is set at F5.6, the system control portion 11 sets the determination threshold at b which is larger than a.

When the F-number is large, the light quantity incident on the solid-state imaging device 5 decreases. The phase difference AF processing portion 19 calculates a phase difference amount by use of the output signals of the phase difference detection pixels 51R and 51L but the phase difference detection pixels 51R and 51L are lower in sensitivity than the imaging pixels 51. For this reason, when the incident light quantity decreases, calculation accuracy of the phase difference amount cannot be maintained. Therefore, when the F-number is large, the determination threshold is increased to increase the possibility to select the contrast AF, as shown in FIG. 4B. Accordingly, the AF accuracy can be prevented from deteriorating.

Incidentally, even when the parameter determining the determination threshold in FIG. 4A and FIG. 4B is replaced by a luminance value of an image signal obtained by imaging the photographic subject, a similar effect can be obtained.

Figure 5A:
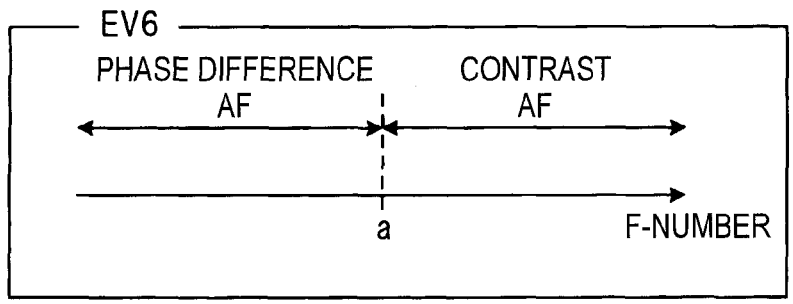
FIGS. 5A and 5B are views explaining another example for setting a determination threshold as a criterion based on which focus control is changed over between phase difference AF and contrast AF.
Figure 5B:
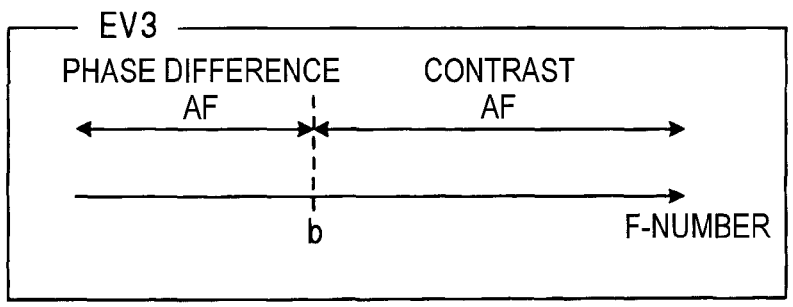

FIGS. 5A and 5B are views explaining another example for setting a determination threshold as a criterion based on which focus control is changed over between the phase difference AF and the contrast AF.

In the example of FIGS. 5A and 5B, a determination threshold is set for the F-number of the solid-state imaging device 5 and the determination threshold can be varied in accordance with the exposure value of the solid-state imaging device 5.

As shown in FIG. 5A, when the EV value is set at 6, the system control portion 11 selects the phase difference AF processing portion 19 in the range in which the set F-number is lower than a determination threshold a, and selects the contrast AF processing portion 18 in the range in which the set F-number is not lower than the determination threshold a.

In addition, as shown in FIG. 5B, when the EV value is set at 3, the system control portion 11 sets the determination threshold at b which is smaller than a.

When the EV value is small, the light quantity incident on the solid-state imaging device 5 decreases. Therefore, when the EV value is small, the determination threshold is reduced to increase the possibility to select the contrast AF, as shown in FIG. 5B. Accordingly, the AF accuracy can be prevented from deteriorating.

Figure 6A:
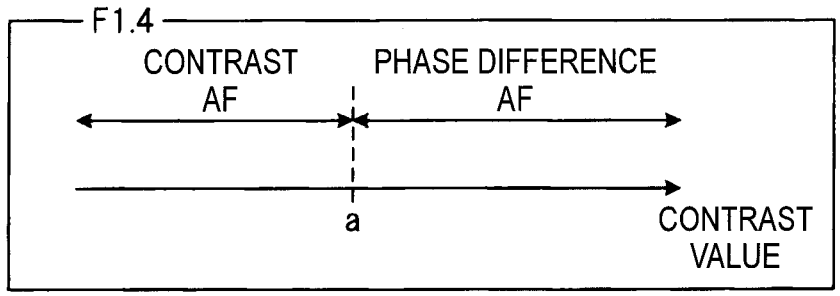
FIGS. 6A and 6B are views explaining another example for setting a determination threshold as a criterion based on which focus control is changed over between phase difference AF and contrast AF.
Figure 6B:
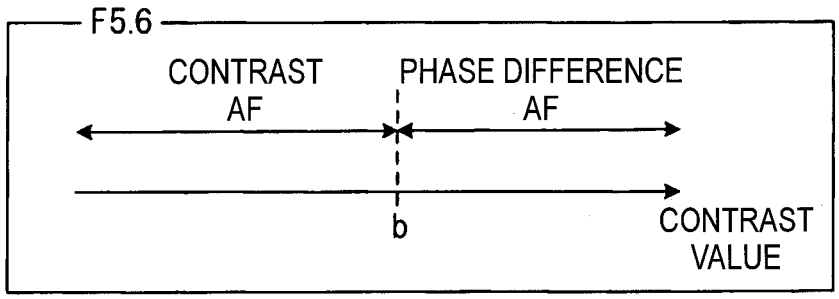

FIGS. 6A and 6B are views explaining another example for setting a determination threshold as a criterion based on which focus control is changed over between the phase difference AF and the contrast AF.

In the example of FIGS. 6A and 6B, a determination threshold is set for a contrast value of a photographic subject to be imaged, and the determination threshold can be varied in accordance with the F-number of the imaging optical system.

As shown in FIG. 6A, when the F-number is F1.4, the system control portion 11 selects the contrast AF processing portion 18 in the range where the contrast value of the photographic subject to be imaged by the selected AF area 52 is lower than a determination threshold a, and selects the phase difference AF processing portion 19 in the range where the contrast value is not lower than the determination threshold a.

In addition, as shown in FIG. 6B, when the F-number is F5.6, the system control portion 11 sets the determination threshold at b which is larger than a.

Also in the example of FIG. 6B, the AF accuracy can be prevented from deteriorating.

Figure 7A:
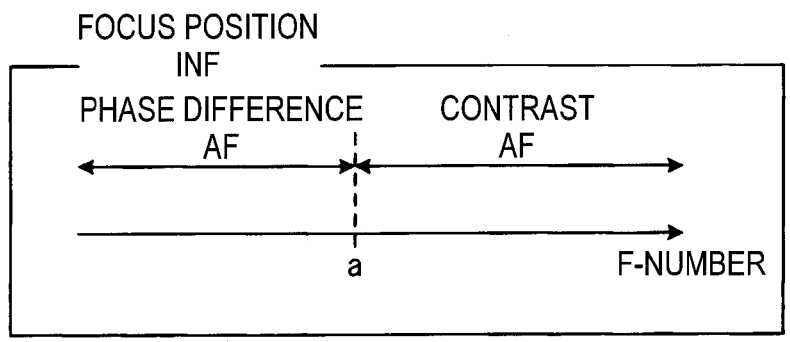
FIGS. 7A and 7B are views explaining another example for setting a condition which changes a determination threshold as a criterion based on which focus control is changed over between phase difference AF and contrast AF.
Figure 7B:
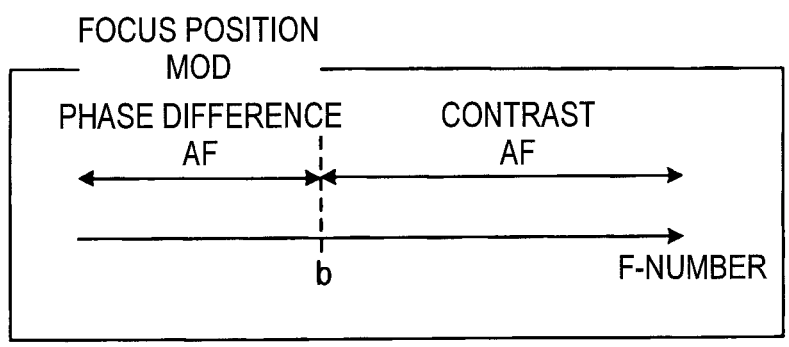

FIGS. 7A and 7B are views explaining another example for setting a condition which changes a determination threshold as a criterion on which focus control is changed over between the phase difference AF and the contrast AF.

In the example of FIGS. 7A and 7B, a determination threshold is set for the F-number of the imaging optical system, and the determination threshold can be varied in accordance with the position of the focus lens (focus position) included in the imaging optical system.

As shown in FIG. 7A, when the focus position is INF, the system control portion 11 selects the phase difference AF processing portion 19 in the range where the set F-number is lower than a determination threshold a, and selects the contrast AF processing portion 18 in the range where the set F-number is not lower than the determination threshold a.

In addition, as shown in FIG. 7B, when the focus position is MOD, the system control portion 11 sets the determination threshold at b which is smaller than a.

In some lens devices, which have the same set F value, the light quantity incident on the solid-state imaging device 5 may decrease as the focus position is closer to the MOD side. In order to support such a lens device, the determination threshold is reduced as the focus position is closer to the MOD side, as shown in FIG. 7B. Accordingly, the AF accuracy can be prevented from deteriorating.

In each AF area 52, a plurality of phase difference pair rows are arranged side by side in the column direction Y. The phase difference AF processing portion 19 calculates phase difference amounts for the respective phase difference pair rows by correlation calculation. For example, the phase difference AF processing portion 19 averages the calculated phase difference amounts for the respective rows and obtains a final phase difference amount. That is, as the number of phase difference pair rows included in the AF area 52 is larger, the calculation accuracy of the phase difference amount is higher.

Accordingly, the width (AF area size) of the selected AF area 52 in the column direction Y may be set as a parameter determining a determination threshold.

Figure 8A:
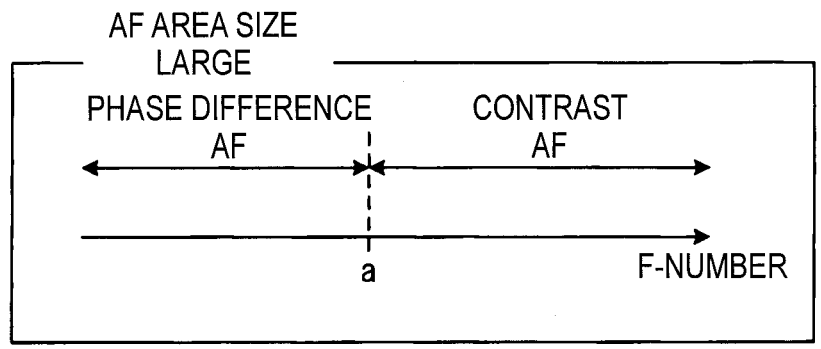
FIGS. 8A and 8B are views explaining another example for setting a condition which changes a determination threshold as a criterion based on which focus control is changed over between phase difference AF and contrast AF.
Figure 8B:
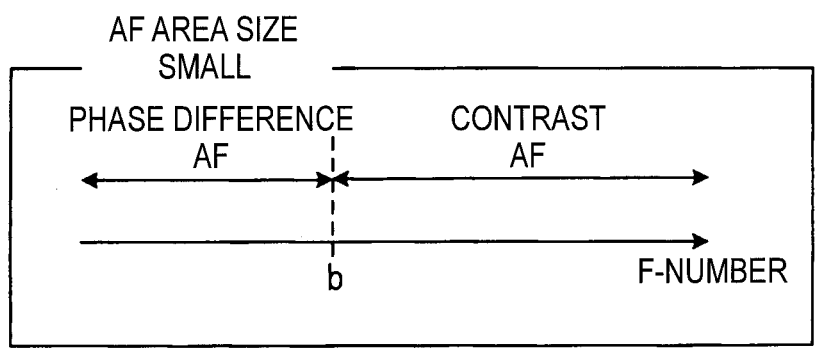

FIGS. 8A and 8B are views explaining another example for setting a condition which changes a determination threshold as a criterion based on which focus control is changed over between the phase difference AF and the contrast AF.

In the example of FIGS. 8A and 8B, a determination threshold is set for the F-number of the imaging optical system, and the determination threshold can be varied in accordance with the AF area size.

As shown in FIG. 8A, when the AF area size is large, the system control portion 11 selects the phase difference AF processing portion 19 in the range in which the set F-number is lower than a determination threshold a, and selects the contrast AF processing portion 18 in the range in which the set F-number is not lower than the determination threshold a.

In addition, as shown in FIG. 8B, when the AF area size is small, the system control portion 11 sets the determination threshold at b which is smaller than a.

When an optimal AF system is selected in this manner, the AF accuracy can be improved.

In a mode in which priority is placed on a photographing speed for moving image photographing, continuous photographing, etc., the resolution of an image to be taken is set to be low. Low resolution gives a less influence on the taken image even if the AF accuracy is somewhat poor. Accordingly, the set image resolution may be set as a parameter determining a determination threshold.

Figure 9A:
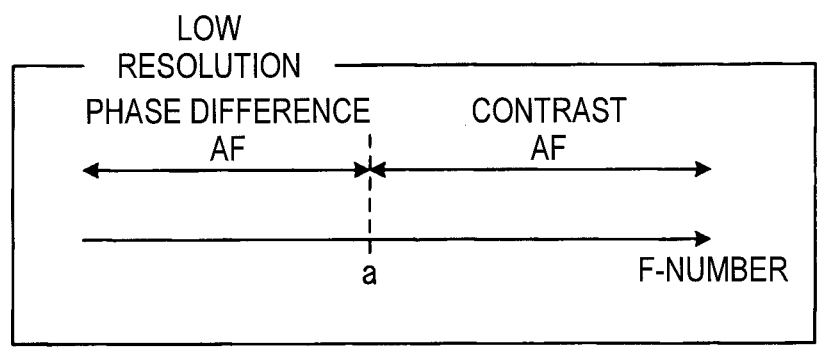
FIGS. 9A and 9B are views explaining another example for setting a condition which changes a determination threshold as a criterion based on which focus control is changed over between phase difference AF and contrast AF.
Figure 9B:
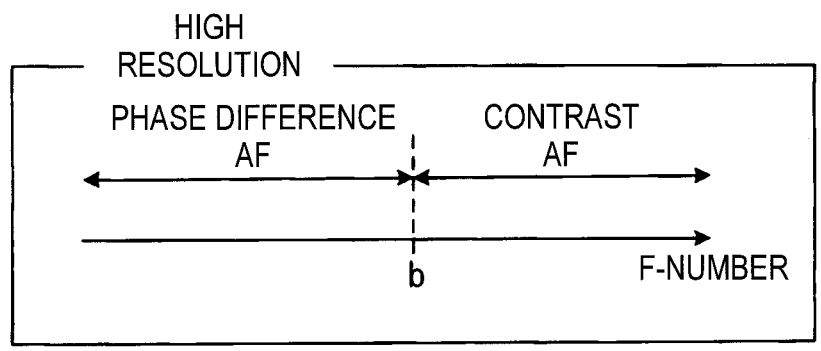

FIGS. 9A and 9B are views explaining another example for setting a condition which changes a determination threshold as a criterion based on which focus control is changed over between the phase difference AF and the contrast AF.

In the example of FIGS. 9A and 9B, a determination threshold is set for the F-number of the imaging optical system, and the determination threshold can be varied in accordance with the image resolution.

As shown in FIG. 9A, when the image resolution is low, the system control portion 11 selects the phase difference AF processing portion 19 in the range in which the set F-number is lower than a determination threshold a, and selects the contrast AF processing portion 18 in the range in which the set F-number is not lower than the determination threshold a.

In addition, as shown in FIG. 9B, when the image resolution is high, the system control portion 11 sets the determination threshold at b which is larger than a.

When an optimal AF system is selected in accordance with the image resolution in this manner, the AF accuracy can be improved.

In the case where the focal length of the imaging optical system is long, the size of a main photographic subject to be imaged increases to thereby lower the contrast, in comparison with the case where the focal length of the imaging optical system is short. Accordingly, the focal length of the imaging optical system may be set as a parameter determining a determination threshold.

Figure 10A:
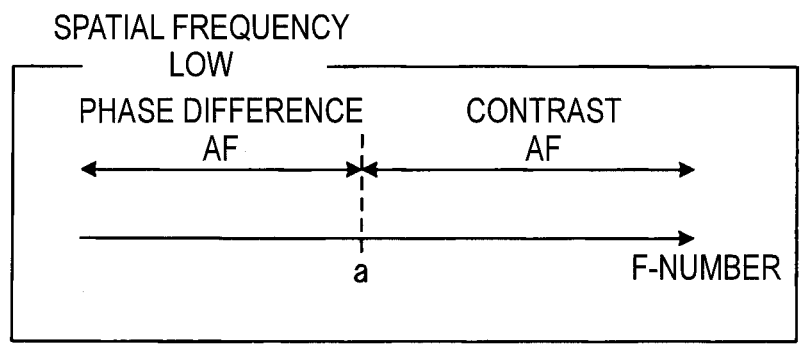
FIGS. 10A and 10B are views explaining another example for setting a condition which changes a determination threshold as a criterion based on which focus control is changed over between phase difference AF and contrast AF.
Figure 10B:
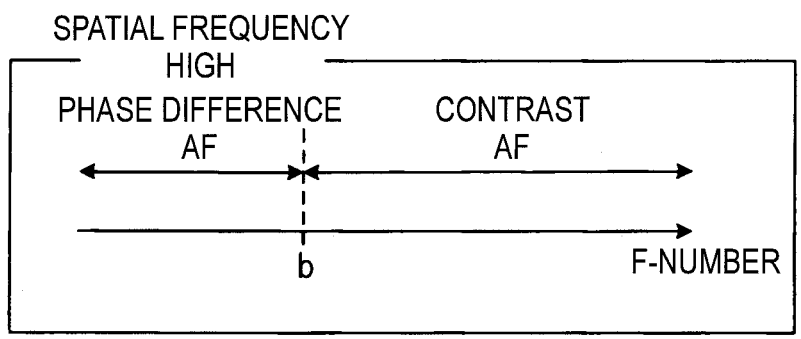

FIGS. 10A and 10B are views explaining another example for setting a condition which changes a determination threshold as a criterion based on which focus control is changed over between the phase difference AF and the contrast AF.

In the example of FIGS. 10A and 10B, a determination threshold is set for the F-number of the imaging optical system and the determination threshold can be varied in accordance with the spatial frequency of the photographic subject.

As shown in FIG. 10A, when the spatial frequency of the photographic subject is low, the system control portion 11 selects the phase difference AF processing portion 19 in the range in which the set F-number is lower than a determination threshold a, and selects the contrast AF processing portion 18 in the range in which the set F-number is not lower than the determination threshold a.

In addition, as shown in FIG. 10B, when the spatial frequency of the photographic subject is high, the system control portion 11 sets the determination threshold at b which is smaller than a.

When the spatial frequency of the photographic subject is high, the accuracy of the phase difference AF deteriorates easily. Therefore, when an optimal AF system is selected in accordance with the spatial frequency of the photographic subject in this manner, the AF accuracy can be improved.

Figure 11A:
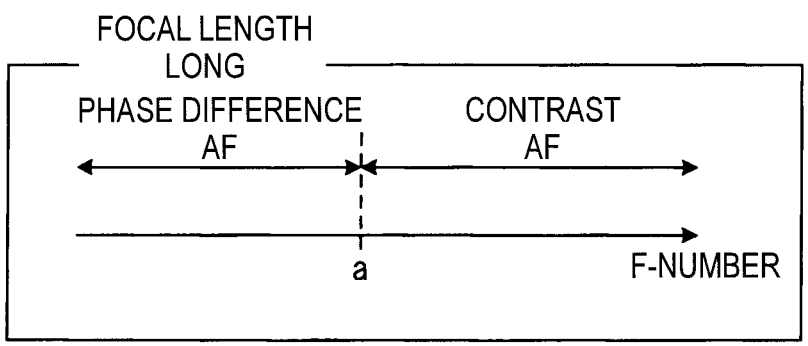
FIGS. 11A and 11B are views explaining another example for setting a condition which changes a determination threshold as a criterion based on which focus control is changed over between phase difference AF and contrast AF.
Figure 11B:
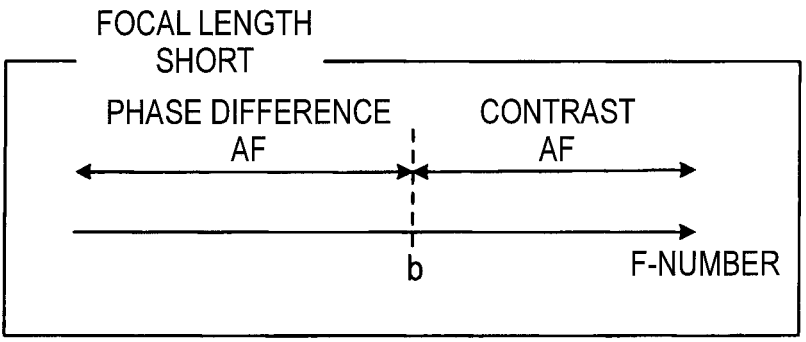

FIGS. 11A and 11B are views explaining another example for setting a condition which changes a determination threshold as a criterion based on which focus control is changed over between the phase difference AF and the contrast AF.

In the example of FIGS. 11A and 11B, a determination threshold is set for the F-number of the imaging optical system, and the determination threshold can be varied in accordance with the focal length of the imaging optical system.

As shown in FIG. 11A, when the focal length is long, the system control portion 11 selects the phase difference AF processing portion 19 in the range in which the set F-number is lower than a determination threshold a, and selects the contrast AF processing portion 18 in the range in which the set F-number is not lower than the determination threshold a.

In addition, as shown in FIG. 11B, when the focal length is short, the system control portion 11 sets the determination threshold at b which is larger than a. This is because the short focal length leads to higher contrast so that the phase difference AF can be performed up to a higher F-number.

When an optimal AF system is selected in accordance with the focal length in this manner, the AF accuracy can be improved.

Although the examples in each of which the determination threshold is determined based on one parameter have been described so far, the determination threshold may be determined based on a combination of parameters.

Figure 12A:
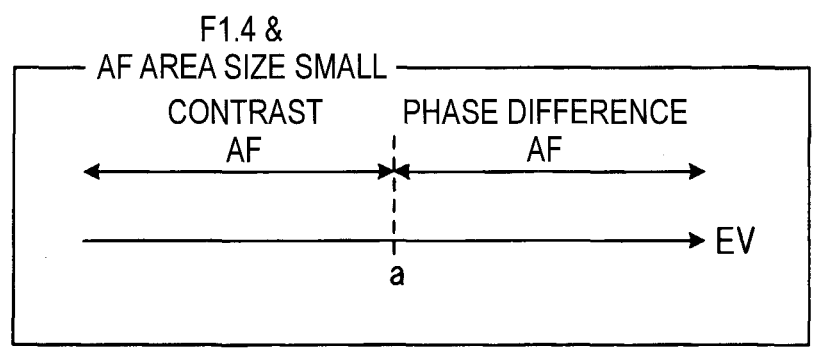
FIGS. 12A and 12B are views explaining another example for setting a condition which changes a determination threshold as a criterion based on which focus control is changed over between phase difference AF and contrast AF.
Figure 12B:
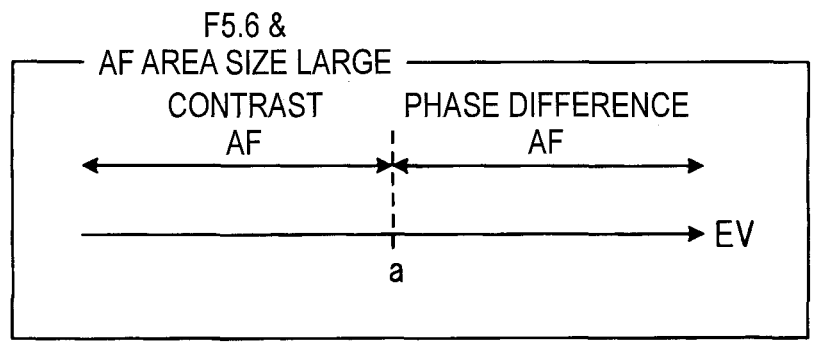

FIGS. 12A and 12B are views explaining another example for setting a condition which changes a determination threshold as a criterion based on which focus control is changed over between the phase difference AF and the contrast AF.

In the example of FIGS. 12A and 12B, a determination threshold is set for the exposure value (EV value) of the solid-state imaging device 5, and the determination threshold can be varied in accordance with the F-number of the imaging optical system and the AF area size.

As shown in FIG. 12A, when the F-number is set at F1.4 and the AF area size is small, the system control portion 11 selects the contrast AF processing portion 18 in the range in which the set EV value is lower than a determination threshold a, and selects the phase difference AF processing portion 19 in the range in which the set EV value is not lower than the determination threshold a.

On the other hand, as shown in FIG. 12B, when the F-number is set at F5.6 and the AF area size is large, the system control portion 11 sets the determination threshold at a. In addition, when the F-number is set at F1.4 and the AF area size is large, the system control portion 11 sets the determination threshold at a value smaller than a.

When the determination threshold is determined in accordance with the parameters in this manner, it is easy to use an AF system with higher accuracy and it is possible to improve the imaging quality.

Although the determination threshold is determined in accordance with the combination of the F-number and the AF area size in FIGS. 12A and 12B, a higher effect can be obtained when the determination threshold is determined in accordance with a combination of at least three parameters selected from the parameters (the F-number, the focal length, the focus position, the luminance of the photographic subject, the contrast of the photographic subject, the AF area size and the image resolution) except the EV value which has been set as the determination threshold.

Figure 13:
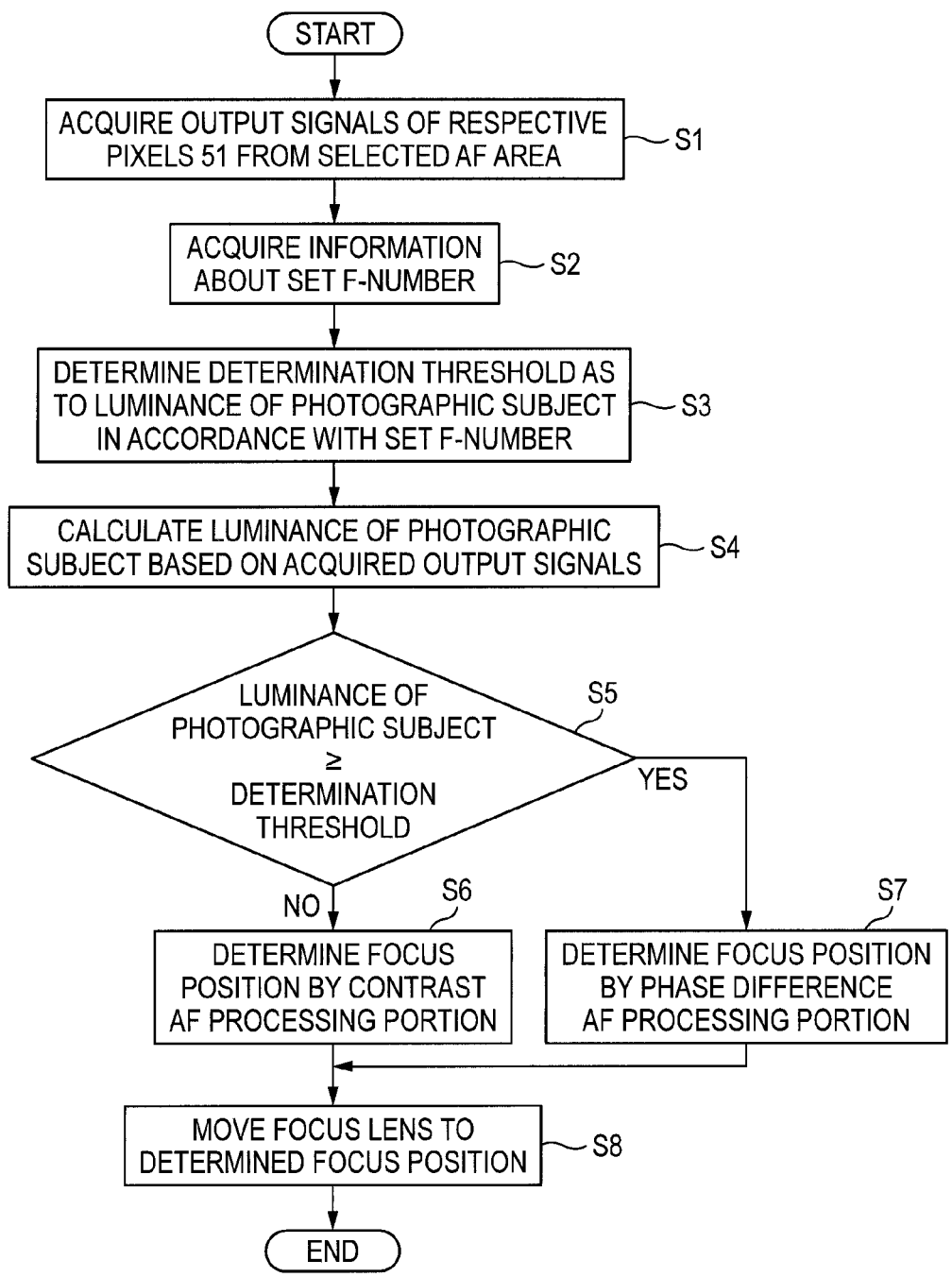
FIG. 13 is a flow chart for explaining AF operation of the digital camera shown in FIG. 1.

FIG. 13 is a flow chart for explaining AF operation of the digital camera shown in FIG. 1. FIG. 13 shows the flow in which the aforementioned one parameter is set as the luminance of the photographic subject to be imaged and the determination threshold is determined in accordance with the F-number.

When the digital camera is set in an imaging mode, the solid-state imaging device 5 starts to perform imaging for generating a live-view image. When a shutter button is half-pushed to issue an AF instruction, the system control portion 11 acquires output signals of the respective pixels 51 in an AF area 52, which has been selected in advance, from a taken image signal taken and obtained by the solid-state imaging device 5 immediately before the AF instruction (step S1).

Next, the system control portion 11 acquires information about the F-number of the imaging optical system which has been set at the time instant when the AF instruction was issued (step S2). The system control portion 11 sets a determination threshold concerned with the luminance of the photographic subject in accordance with the acquired information about the F-number (step S3).

After the determination threshold has been set, the system control portion 11 uses the output signals acquired in the step S1 to calculate a luminance value of the photographic subject to be imaged by the selected AF area 52 (step S4).

Next, the system control portion 11 makes comparison to find out whether the calculated luminance value is at least equal to the determination threshold determined in the step S3 or not (step S5).

When the determination in the step S5 is NO, the system control portion 11 makes the contrast AF processing portion 18 determine a focus position (step S6). On the other hand, when the determination in the step S5 is YES, the system control portion 11 makes the phase difference AF processing portion 19 determine a focus position (step S7).

After the step S6 or S7, the system control portion 11 moves the focus lens to the determined focus position (step S8) and then terminates the focus control performed in accordance with the AF instruction.

As described above, according to the digital camera in the embodiment, the determination threshold for determining whether to perform phase difference AF or perform contrast AF is determined based on any photographic subject condition or any imaging condition etc. Accordingly, it is possible to select an AF system suitable for the photographic subject condition or the imaging condition so that it is possible to improve the AF accuracy.

Although the solid-state imaging device 5 in which the pixels 51 are disposed in a so-called honeycomb array has been described so far by way of example, the invention can be also applied to a solid-state imaging device in which pixels 51 are disposed in a square lattice-like array.

Moreover, although the solid-state imaging device 5 has been described so far on assumption that it is mounted with color filters with a plurality of colors to perform color imaging, the solid-state imaging device 5 may be formed as an imaging device in which the color filters are limited to one single color of green or removed for monochrome imaging.

In addition, in the above description, the solid-state imaging device 5 is used as an imaging device in which the imaging pixels 51 and the phase difference detection pixels 51R and 51L are provided mixedly in order to take an image and detect a phase difference. However, configuration may be made so that a device exclusive for phase difference AF and provided with no imaging pixel 51 can be provided separately from the solid-state imaging device 5 in the camera body 200 and the phase difference AF processing portion 19 can determine a focus position based on an output signal from this exclusive device.

In addition, although the digital camera has been described as the imaging apparatus so far by way of example, the technique of the embodiment can be also applied to a camera-including smartphone.

Next, the configuration of the camera-including smartphone will be described.

Figure 14:
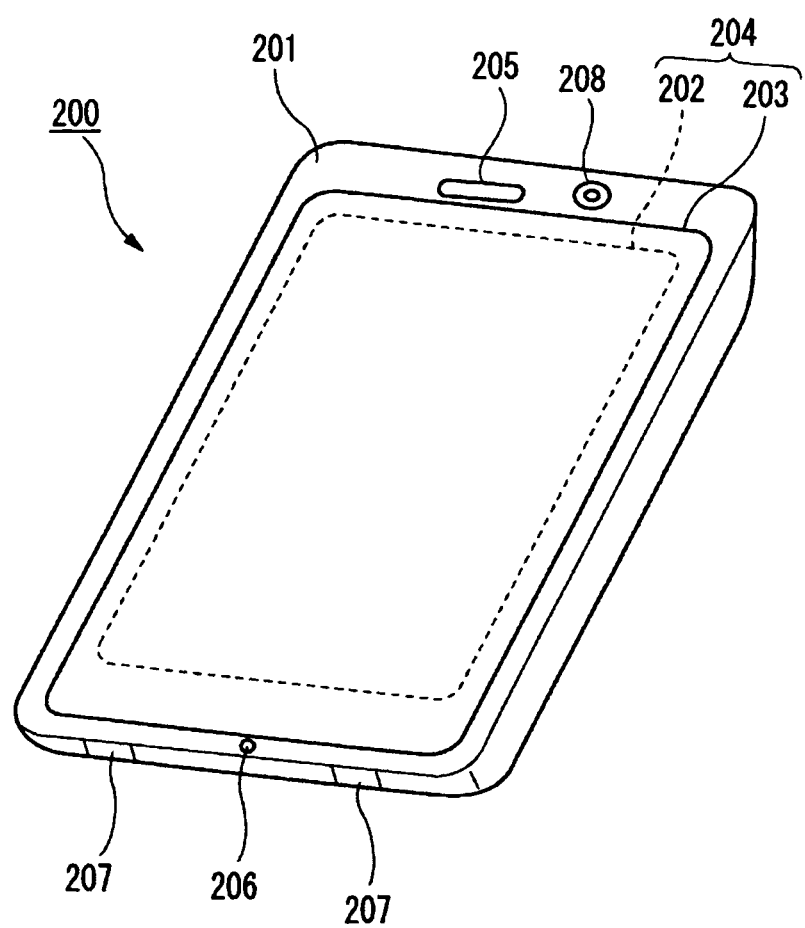
FIG. 14 is a view explaining a smartphone as the imaging apparatus.

FIG. 14 shows the external appearance of a smartphone 200 as an embodiment of the imaging apparatus according to the invention. The smartphone 200 shown in FIG. 14 has a flat plate-like housing 201. The smartphone 200 is provided with a display input portion 204 in one surface of the housing 201. The display input portion 204 includes a display panel 202 formed as a display portion, and an operating panel 203 serving as an input portion and integrated with the display panel 202. In addition, such a housing 201 is provided with a speaker 205, a microphone 206, operating portions 207, and a camera portion 208. Incidentally, the configuration of the housing 201 is not limited thereto. For example, the housing 201 may use a configuration in which the display portion and the input portion are provided independently of each other or may use a configuration which has a folding structure or a sliding mechanism.

Figure 15:
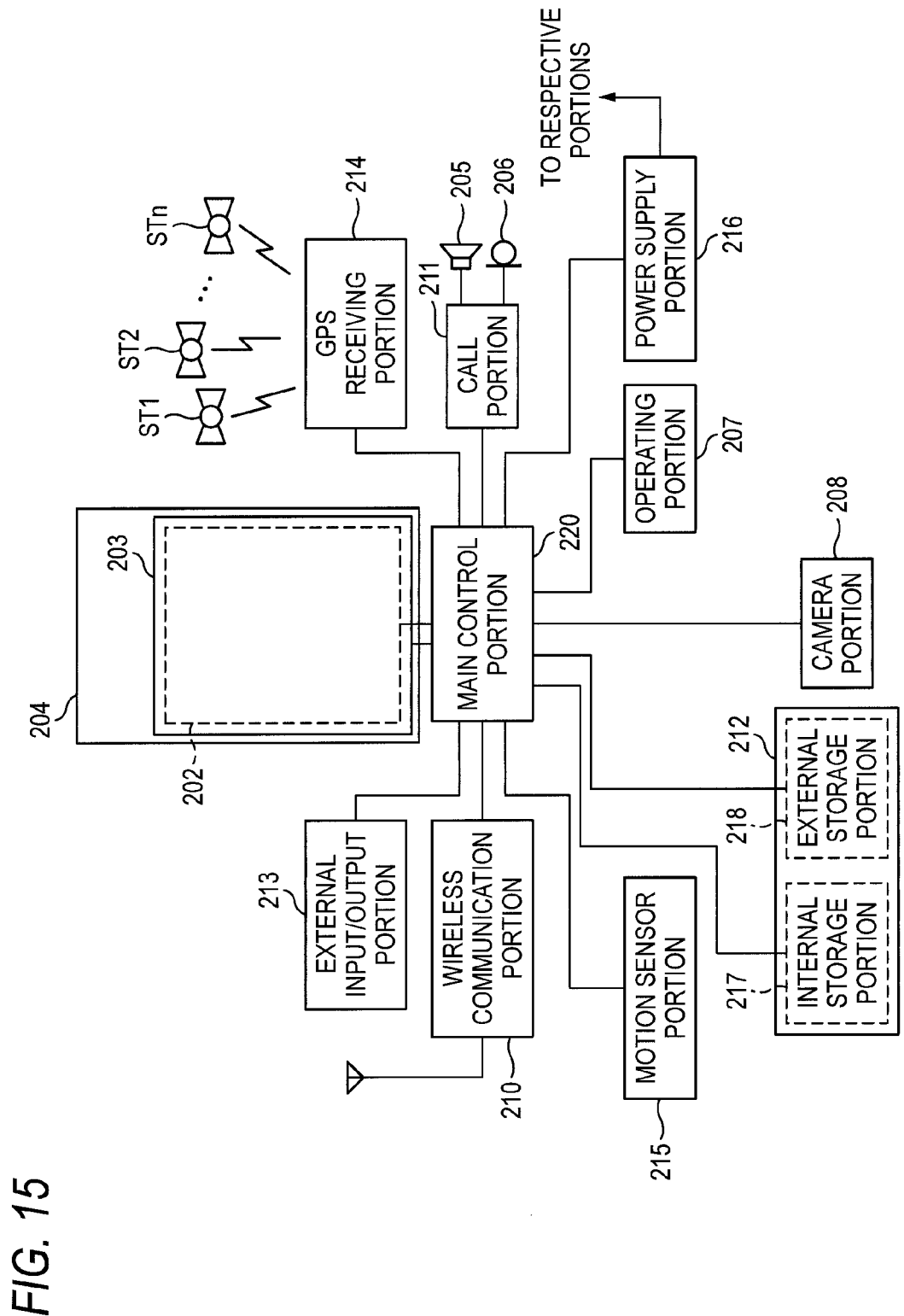
FIG. 15 is an internal block diagram of the smartphone shown in FIG. 14.

FIG. 15 is a block diagram showing the configuration of the smartphone 200 shown in FIG. 14. As shown in FIG. 15, a wireless communication portion 210, the display input portion 204, a call portion 211, the operating portions 207, the camera portion 208, a storage portion 212, an external input/output portion 213, a GPS (Global Positioning System) receiving portion 214, a motion sensor portion 215, a power supply portion 216, and a main control portion 220 are provided as main constituent elements of the smartphone. In addition, a wireless communication function for performing mobile wireless communication through a not-shown base station apparatus BS and a not-shown mobile communication network NW is provided as a main function of the smartphone 200.

The wireless communication portion 210 performs wireless communication with the base station apparatus BS located in the mobile communication network NW in accordance with an instruction of the main control portion 220. The wireless communication portion 210 uses the wireless communication to receive/transmit various file data such as audio data and image data, electronic mail data, etc. or receive Web data, streaming data etc.

The display input portion 204 is a so-called touch panel which is provided with the display panel 202 and the operating panel 203 and which is operated under the control of the main control portion 220 to display images (still images and moving images), character information, etc. to thereby visually communicate information to a user, and to detect a user's operation on the displayed information.

In the display panel 202, an LCD (Liquid Crystal Display), an GELD (Organic Electro-Luminescence Display) or the like is used as a display device.

The operating panel 203 is a device which is installed in such a manner that an image displayed on a display surface of the display panel 202 can be visually recognized and which detects one coordinate or a plurality of coordinates operated by a user's finger or a stylus. When this device is operated by the user's finger or the stylus, a detection signal generated due to the operation is outputted to the main control portion 220. Next, the main control portion 220 detects an operation position (coordinates) on the display panel 202 based on the received detection signal.

Although the display panel 202 and the operating panel 203 of the smartphone 200 illustrated as the embodiment of the imaging apparatus according to the invention are integrated with each other to form the display input portion 204 as shown in FIG. 14, the operating panel 203 is arranged to entirely cover the display panel 202.

When such an arrangement is used, the operating panel 203 may provide a function of detecting a user's operation in the remaining region other than the display panel 202. In other words, the operating panel 203 may be provided with a detection region (hereinafter referred to as display region) about an overlapping part overlapping with the display panel 202, and a detection region (hereinafter referred to as non-display region) about the remaining outer edge part not overlapping with the display panel 202.

Incidentally, although the size of the display region and the size of the display panel 202 may be made perfectly coincident with each other, it is not necessary to make the both coincident with each other. In addition, the operating panel 203 may be provided with two sensitive regions which correspond to an outer edge part and the other inside part respectively. Further, the width of the outer edge part is designed suitably in accordance with the size of the housing 201 etc. Further, examples of a position detection system used by the operating panel 203 include a matrix switch system, a resistive film system, a surface acoustic wave system, an infrared ray system, an electromagnetic induction system, an electrostatic capacitance system, etc., and any of these systems may be used.

The call portion 211 is provided with the speaker 205 and the microphone 206. The call portion 211 converts user's voice inputted through the microphone 206 into audio data which can be processed by the main control portion 220 and outputs the converted audio data to the main control portion 220, or decodes audio data received by the wireless communication portion 210 or the external input/output portion 213 and outputs the decoded audio data from the speaker 205. In addition, as shown in FIG. 14, for example, the speaker 205 can be installed in the same surface as the surface where the display input portion 204 is provided and the microphone 206 can be installed in a side surface of the housing 201.

Each operating portion 207 is a hardware key using a key switch etc. to accept an instruction from the user. For example, as shown in FIG. 14, each operating portion 207 is installed in the side surface of the housing 201 of the smartphone 200. The operating portion 207 is a push bottom type switch which is turned ON when being pushed down by a user's finger etc., and which is turned OFF by a restoration force of a spring etc. when being released from the user's finger.

The storage portion 212 stores control programs or control data of the main control portion 220, application software, address data associated with names and phone numbers etc. of communication partners, data of transmitted/received electronic mails, Web data downloaded due to Web browsing or downloaded contents data, and temporarily stores streaming data etc. In addition, the storage portion 212 is constituted by an internal storage portion 217 built in the smartphone and an external storage portion 218 having an attachable/detachable external memory slot. Incidentally, each of the internal storage portion 217 and the external storage portion 218 constituting the storage portion 212 is achieved by use of a storage medium such as a flash memory type memory, a hard disk type memory, a multimedia card micro type memory, a card type memory (such as a MicroSD (registered trademark) memory etc.), an RAM (Random Access Memory), or an ROM (Read Only Memory).

The external input/output portion 213 fulfills the role as an interface with all external appliances connected to the smartphone 200. The external input/output portion 213 is provided for making direct or indirect connection with other external appliances by communication etc. (such as USB (Universal Serial Bus), IEEE1394, etc.) or by a network (such as the Internet, a wireless LAN, Bluetooth (registered trademark), RFID (Radio Frequency Identification), IrDa (Infrared Data Association) (registered trademark), UWB (Ultra Wideband (registered trademark), ZigBee (registered trademark), etc.).

Examples of the external appliances connected to the smartphone 200 include a wired/wireless headset, a wired/wireless external charger, a wired/wireless data port, a memory card or an SIM (Subscriber Identity Module) card/UIM (User Identify Module) card connected through a card socket, an external audio video appliance connected through an audio video I/O (Input/Output) terminal, an external audio video appliance connected by wireless, a smartphone connected by wire or wireless, a personal computer connected by wire or wireless, a PDA connected by wire or wireless, an earphone connected by wire or wireless, etc. The external input/output portion 213 can transfer data transmitted from such an external appliance to each constituent element inside the smartphone 200 or internal data of the smartphone 200 can be transmitted to the external appliance.

The GPS receiving portion 214 receives GPS signals transmitted from GPS satellites ST1 to STn in accordance with an instruction of the main control portion 220, executes positioning computation processing based on the received GPS signals, and detects the position of the smartphone 200 indicated by latitude, longitude and altitude. When position information can be acquired through the wireless communication portion 210 or the external input/output portion 213 (such as a wireless LAN), the GPS receiving portion 214 may detect the position by use of the position information.

For example, the motion sensor portion 215 is provided with a three-axis acceleration sensor etc. which detects physical motion of the smartphone 200 in accordance with an instruction of the main control portion 220. When the physical motion of the smartphone 200 is detected, the direction and acceleration of the motion of the smartphone 200 are detected. The detection result obtained thus is outputted to the main control portion 220.

The power supply portion 216 supplies electric power stored in a battery (not shown) to the respective portions of the smartphone 200 in accordance with an instruction of the main control portion 220.

The main control portion 220 is provided with a microprocessor which operates in accordance with the control programs or the control data stored in the storage portion 212 to generally control the respective portions of the smartphone 200. In addition, the main control portion 220 can provide a mobile communication control function for controlling respective portions of a communication system in order to perform audio communication or data communication through the wireless communication portion 210, and an application processing function.

The application processing function is implemented by the main control portion 220 which operates in accordance with the application software stored in the storage portion 212. Examples of the application processing function include an IrDa function for controlling the external input/output portion 213 to perform data communication with an opposing appliance, an electronic mail function for transmitting and receiving electronic mails, a Web browsing function for browsing Web pages, etc.

In addition, the main control portion 220 provides an image processing function, for example, for displaying video on the display input portion 204 based on image data (data of still images or moving images) such as received data or downloaded streaming data. The image processing function means a function by which the main control portion 220 can decode the image data, apply image processing to the decoding result, and display images on the display input portion 204.

Further, the main control portion 220 executes display control on the display panel 202, and operation detection control for detecting a user's operation performed through the operating portion 207 or the operating panel 203. The main control portion 220 executing the display control displays an icon for starting up application software or a software key such as a scroll bar, or displays a window for generating an electronic mail. Incidentally, the scroll bar means a software key for accepting an instruction to move a display portion of an image such as an image which is too large to be accommodated in the display region of the display panel 202.

In addition, the main control portion 220 executing the operation detection control detects a user's operation performed through the operating portion 207, accepts an operation on the icon or input of a character string to an input field of the window through the operating panel 203, or accepts a scroll request of a display image made through the scroll bar.

Further, the main control portion 220 executing the operation detection control provides a touch panel control function for determining whether the operation position on the operating panel 203 is the overlapping part (display region) overlapping with the display panel 202 or the remaining outer edge part (non-display region) not overlapping with the display panel 202, and controlling the sensitive regions of the operating panel 203 and the display position of the software key.

In addition, the main control portion 220 may detect a gesture operation on the operating panel 203 and execute a preset function in accordance with the detected gesture operation. The gesture operation does not mean a simple touch operation as in the background art but means an operation in which a trajectory is drawn by a user's finger etc. or a plurality of positions are designated simultaneously or combined to draw a trajectory about at least one of the plurality of positions.

The camera portion 208 includes a configuration other than the external memory control portion 20, the recording medium 21, the display control portion 22, the display portion 23, and the operating portion 14 in the camera body 200 shown in FIG. 1. Taken image data generated by the camera portion 208 can be recorded in the storage portion 212 or outputted through the input/output portion 213 or the wireless communication portion 210. In the smartphone 200 shown in FIG. 14, the camera portion 208 is installed in the same surface as the display input portion 204. However, the position where the camera portion 208 is installed is not limited thereto but the camera portion 208 may be installed in the back of the display input portion 204.

In addition, the camera portion 208 can be used for various functions of the smartphone 200. For example, an image acquired by the camera portion 208 can be displayed on the display panel 202 or an image of the camera portion 208 can be used as one of operation inputs of the operating panel 203. In addition, when the GPS receiving portion 204 detects a position, the position may be detected with reference to an image from the camera portion 208. Further, an optical axis direction of the camera portion 208 of the smartphone 200 or a current usage environment may be determined with reference to an image from the camera portion 208 without using the three-axis acceleration sensor or in combination with the three-axis acceleration sensor. It is a matter of course that an image from the camera portion 208 may be used in application software.

Besides, position information acquired by the GPS receiving portion 214, audio information acquired by the microphone 206 (or text information obtained by applying audio text conversion to the audio information by the main control portion etc.), gesture information acquired by the motion sensor portion 215, etc. may be added to image data of each still image or moving image and stored in the storage portion 212 or outputted through the input/output portion 213 or the wireless communication portion 210.

Also in the smartphone 200 having the aforementioned configuration, the solid-state imaging device 5 is used as an imaging device of the camera portion 208, the lens device 100 is attached detachably, and the camera portion 208 performs the processing described in FIGS. 4A-4B to FIG. 13. In this manner, AF can be performed with high accuracy and photographing can be performed with high quality.

As described above, the following items are disclosed in the description of the invention.

The disclosed imaging apparatus includes: an imaging device which images a photographic subject through an imaging optical system including a focus lens; a focus control portion which selects and executes one from first focus control for controlling the focus lens to a focus position based on a phase difference AF system and second focus control for controlling the focus lens to a focus position based on a contrast AF system in accordance with the relation between a determination threshold set for one of parameters correlating with contrast or brightness of the photographic subject to be imaged by the imaging device and a value taken by the one parameter when an instruction to perform focus control on the focus lens has been issued; and a determination threshold varying portion which can vary the determination threshold in accordance with a predetermined condition; wherein: the parameters include parameters concerned with photographic subject conditions and parameters concerned with imaging conditions set in the imaging apparatus.

In the disclosed imaging apparatus, the determination threshold varying portion can vary the determination threshold in accordance with at least one of the parameters other than the one parameter, the size of the photographic subject from which a phase difference used in the first focus control should be detected, a set image resolution, and a spatial frequency of the photographic subject.

In the disclosed imaging apparatus, the parameters concerned with the imaging conditions include an F-number of the imaging optical system, the position of the focus lens included in the imaging optical system, a focal length of the imaging optical system, and an exposure value of the imaging device; and the parameters concerned with the photographic subject conditions include a contrast value and a luminance value of the photographic subject to be imaged.

In the disclosed imaging apparatus, the one parameter is an F-number of the imaging optical system or an exposure value of the imaging device; and the determination threshold varying portion can vary the determination threshold in accordance with the exposure value of the imaging device or the F-number of the imaging optical system.

In the disclosed imaging apparatus, the one parameter is an F-number of the imaging optical system or an exposure value of the imaging device; and the determination threshold setting portion can vary the determination threshold in accordance with the size of the photographic subject, the image resolution, or the position of the focus lens.

The disclosed imaging apparatus further includes: a mount mechanism on which the imaging optical system can be detachably mounted.

The disclosed focus control method includes: a focus control step of selecting and executing one from first focus control for controlling a focus lens to a focus position based on a phase difference AF system and second focus control for controlling the focus lens to a focus position based on a contrast AF system in accordance with the relation between a determination threshold set for one of parameters correlating with contrast or brightness of a photographic subject to be imaged by an imaging device and a value taken by the one parameter when an instruction to perform focus control on the focus lens disposed in front of the imaging device has been issued; and a determination threshold varying step of being capable of varying the determination threshold in accordance with a predetermined condition; wherein: the parameters include parameters concerned with photographic subject conditions and parameters concerned with imaging conditions.

INDUSTRIAL APPLICABILITY

According to the invention, it is possible to provide an imaging apparatus and a focus control method in which an optimal AF system can be selected in accordance with an environment in which an image of a photographic subject is taken, an imaging condition in which the image is taken, etc. so that the quality of the taken image can be improved.

Although the invention has been described above in accordance with a specific embodiment, the invention is not limited to this embodiment but may be changed variously without departing from the technical ideas of the disclosed invention.

The invention claimed is:

1. An imaging apparatus comprising:
   an imaging device which images a photographic subject through an imaging optical system comprising a focus lens;
   a focus control portion which compares a determination threshold set for one of parameters with a value taken by the one parameter on issuing an instruction to perform focus control of the focus lens, changes over the focus control to one selected from first focus control for controlling the focus lens to a focus position based on a phase difference AF system and second focus control for controlling the focus lens to a focus position based on a contrast AF system in accordance with whether the value of the one parameter is lower than the determination threshold or not, and executes the selected focus control, the parameters comprising a plurality of parameters concerned with photographic subject conditions and a plurality of parameters concerned with imaging conditions set in the imaging apparatus, the parameters concerned with the photographic subject conditions comprising a contrast value and a luminance value of the photographic subject to be imaged by the imaging device, the parameters concerned with the imaging conditions comprising an F-number of the imaging optical system, a position of the focus lens included in the imaging optical system, a focal distance of the imaging optical system and an exposure value of the imaging device; and
   a determination threshold varying portion which is capable of varying the determination threshold in accordance with at least one of parameters comprising the contrast value, the luminance value and a spatial frequency of the photographic subject to be imaged by the imaging device but excluding the one parameter set as the determination threshold.

2. The imaging apparatus according to claim 1, further comprising:
   a mount mechanism on which the imaging optical system can be detachably mounted.

3. A focus control method performed by an imaging apparatus having an imaging device which images a photographic subject through an imaging optical system comprising a focus lens; the method comprising:
   comparing a determination threshold set for one of parameters with a value taken by the one parameter on issuing an instruction to perform focus control of the focus lens, changing over the focus control to one selected from first focus control for controlling the focus lens to a focus position based on a phase difference AF system and second focus control for controlling the focus lens to a focus position based on a contrast AF system in accordance with whether the value of the one parameter is lower than the determination threshold or not, and executing the selected focus control, the parameters comprising a plurality of parameters concerned with photographic subject conditions and a plurality of parameters concerned with imaging conditions set in the imaging apparatus, the parameters concerned with the photographic subject conditions comprising a contrast value and a luminance value of the photographic subject to be imaged by the imaging device, the parameters concerned with the imaging conditions comprising an F-number of the imaging optical system, a position of the focus lens included in the imaging optical system, a focal distance of the imaging optical system and an exposure value of the imaging device; and
   varying the determination threshold in accordance with at least one of parameters comprising the contrast value, the luminance value and a spatial frequency of the photographic subject to be imaged by the imaging device but excluding the one parameter set as the determination threshold.

* * * * *